United States Patent
Yamada

(10) Patent No.: US 7,170,541 B2
(45) Date of Patent: Jan. 30, 2007

(54) PHOTOGRAPHIC PRINTER CAPABLE OF REDUCING A CURL AMOUNT OF A PRINTED ROLLED PAPER BY BEING KEPT UPON PINCHING ITS BEGINNING END AFTER BEING WOUND BACK UPON A ROLLED PAPER BODY

(75) Inventor: Shuji Yamada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 219 days.

(21) Appl. No.: 11/014,956

(22) Filed: Dec. 20, 2004

(65) Prior Publication Data

US 2005/0140944 A1    Jun. 30, 2005

(30) Foreign Application Priority Data

Dec. 25, 2003    (JP) ............... 2003-430866

(51) Int. Cl.
  B65H 23/34    (2006.01)
  B41J 15/04    (2006.01)
  B41J 11/70    (2006.01)

(52) U.S. Cl. .................................. 347/219
(58) Field of Classification Search ............... 347/218, 347/219, 175; 400/618

See application file for complete search history.

(56) References Cited

FOREIGN PATENT DOCUMENTS

| JP | 06-286921 | * 10/1994 |
| JP | 09-278243 | 10/1997 |
| JP | 11-208001 | 3/1999 |

* cited by examiner

Primary Examiner—Huan Tran
(74) Attorney, Agent, or Firm—Bacon & Thomas, PLLC

(57) ABSTRACT

After a cyan photosensitive layer of a rolled paper 2 is colored by a printing head 6, the printed rolled paper 2a is wound back and is conveyed again upstream upon a rolled paper body 1 at a three times backward movement, referring now to a step S6 depicted in FIG. 4. A beginning end 2a-1 of the printed rolled paper 2a is halted and is kept upon being pinched in a position up to a point of contact P of a nipping portion between the mail roller 4 and the pinch roller 5 for a constant time, such as three (3) seconds. After that, a fourth times forward/backward movements & fixing processes and a fifth times forward movement F are carried out in order as to steps S7 through S9. In a cutting step S10, a cutter 3 cuts respectively the beginning end and a finishing end of the printed rolled paper 2a to produce a printed sheet product to immediately before an ejecting step S11 for ejecting the printed rolled paper 2a as a product by a pair of ejection rollers 11 from a body of the photographic printer.

6 Claims, 3 Drawing Sheets

PHOTOGRAPHIC PRINTER CAPABLE OF REDUCING A CURL AMOUNT OF A PRINTED ROLLED PAPER BY BEING KEPT UPON PINCHING ITS BEGINNING END AFTER BEING WOUND BACK UPON A ROLLED PAPER BODY

BACKGROUND OF THE INVENTION

1. Field of the Invention

The present invention relates to a printing apparatus or an image recording apparatus, in particular, a photographic printer producing a photographic image by means of a printing head upon a rolled paper such as a color thermal recording paper.

2. Description of the Related Art

In the manner which will be described in details, such photographic printers are already known upon laying open of the following patent documents. As a first related art apparatus, a patent document No. 1 is disclosed in Japanese Patent Application, Un examined Prepublication No. 208001 of 1999 (JPH11-208001A).

Referring FIG. 6 of the accompanying drawing corresponding to FIG. 8 of the patent document 1, the first related art apparatus comprises a thermal head 102 for printing a thermal recording paper 101, a platen roller 103 facing the thermal head 102, a driving pivot 4 supported by the platen roller 103, a pair of capstan rollers 105, a support member 102A for supporting the thermal head 102, a support mechanism 106 protruded perpendicularly to the figure from the support member 102A, a pinch roller 107 arranged with the support mechanism 106 on both sides thereof, ultraviolet ray lamps 108 and 109 for yellow and magenta color fixture arranged upon downstream and upstream of the thermal head 102.

In operation of the related art apparatus, the driving pivot 104 is rotated for carrying the color thermal recording paper 101 towards downstream (forward) F and upstream (backward) B, so that the pair of capstan rollers 105 and the pinch roller 107 sandwich upon an up side and a down side of the color thermal recording paper 101 passed between the thermal head 102 and the platen roller 103. When the first forward F is performed, a yellow thermal color layer of the color thermal recording paper 101 by means of the thermal head 102 is colored by the ultraviolet ray lamp 108 for yellow color fixture. When the second forward F is performed, a magenta thermal color layer of the color thermal recording paper 101 by means of the thermal head 102 is colored by the ultraviolet ray lamp 109 for magenta color fixture. When the third forward F is performed, a cyan thermal color layer of the color thermal recording paper 101 by means of the thermal head 102 is colored by the ultraviolet ray lamp (not shown) for cyan color fixture. In such a way, a printed sheet is resultingly cut and is released from the apparatus.

Inasmuch as the color thermal recording paper 101 is the rolled paper and is colored by heating, the rolled paper remains an amount of curl which is directed in an opposite side of a photographic image surface thereof, so that a user is difficult to handle the printed sheet with a curl for pasting upon an album and/or filing.

In order to prevent the rolled paper from occurring the curl of the rolled paper, another example of an image recording apparatus is provided with a feed roller and a sponge roller as a mechanism for only curing the curl of the rolled paper (see FIG. 7 of a patent document No. 2 (Japanese Patent Application, Unexamined Prepublication No. 278243 of 1997 (JPH9-278243A)).

It is, however, disadvantageous in that the mechanism for only curing the curl of the rolled paper is specially required, so that it brings about to increase not only the number of the manufacturing parts but also the manufacturing cost and to thereby reduce size of the related art apparatus.

SUMMARY OF THE INVENTION

Accordingly, it is an object of the present invention to provide a photographic printer with no mechanism for only curing the curl of a rolled paper is specially required, so that it prevents the related art apparatus from increasing not only the number of the manufacturing parts but also the manufacturing cost and can thereby reduce size thereof.

Other objects, features, and advantages of the present invention will become apparent from the following description of the preferred embodiment with reference to the accompanying drawing.

According to the first aspect of the present invention, there is provided with a photographic printer used to print upon a rolled paper (2) which is pulled out so as to be unwound from a rolled paper body (1) and conveyed upstream with a predetermined conveying speed from said rolled paper body for a forward movement, said rolled paper having an inside surface which is wound inside said rolled paper body, said photographic printer comprising: a pick-up roller (3) unwinding and picking up said rolled paper from its beginning end; a nipping portion (P) composed of a main roller (4) and a pinch roller (5) for nipping said beginning end of said rolled paper sandwiched therebetween, so that a nipping arrangement between said main roller and said pinch roller is set with an appropriate distance; a printing head (6) for producing a predetermined photographic image data upon said inside surface as a printed rolled paper (2a); a cutter (10) cutting said printed rolled paper to produce a printed sheet immediately before ejecting from said photographic printer; and photographic control means (16) for controlling to print said predetermined photographic image data upon said rolled paper; wherein said photographic control means comprises convey-halt means (17) for halting to convey upstream said rolled paper for a backward movement until said nipping portion; and halt-convey means (18) for continuing to halt for a constant time and thereafter conveying downstream said rolled paper again, so that said printed sheet is cut in a predetermined position thereof before being ejected; wherein said rolled paper has a photographic region in correspondence to the predetermined photographic image data upon said inside surface of said rolled paper which is pulled out and is unwound from said rolled paper body and said printing head is disposed on a side of said inside surface; wherein a paper body arrangement distance between said rolled paper body and said nipping portion is appropriately set, so that said beginning end of said rolled paper is held in said nipping portion and said photographic region of said rolled paper is rolled back upon said rolled paper body; wherein said photographic control means comprises decelerating means (19) for decelerating to a speed slower than said predetermined conveying speed after halting of said constant time; and wherein said photographic control means comprises acceleration means (20) for accelerating such a slow conveying speed up to said predetermined conveying speed after a finishing end of said rolled paper is passed by said nipping portion.

In accordance with first aspect of the present invention, while the rolled paper is halted for the constant time by the convey-halt means, the beginning end thereof is kept upon being picked up between the main roller and the pinch roller. Although the rolled paper causing a curly paper is wound inside the rolled paper body, the curly paper is forced to be curled in its reverse direction. As a result, an amount of curl thereof by the present invention is reduced, so that the printed sheet is cured so as to be a flat paper before ejecting.

Incidentally, such a curl curing effect is better as to the rolled paper having a long size in a wound direction or lengthwise direction. For example, a panorama size paper is more effective than an L size paper. This is because the panorama size paper's lengthwise size is two times as long as the L size paper, so that the printed region wound again by the rolled paper body of the panorama size paper is also two times as long as the L size paper. Therefore, it is possible to manufacture a product of the printed sheet without deteriorating quality of the printed sheet. Besides, in a practical use, the product is handled to be stuck upon an album, such a way that a file is easily made.

Furthermore, the photographic region is produced as the predetermined photographic image data upon the side corresponding to the printing head.

In addition thereto, the paper body arrangement distance of the rolled paper body and the nipping portion is appropriately set, the beginning end of the rolled paper is held in the nipping portion, and the photographic region of the rolled paper is rolled back upon the rolled paper body. Therefore, an amount of curl thereof by the present invention is reduced, so that the printed sheet is cured as the product so as to be a flat paper before ejecting.

By the decelerating means of the photographic control means, the predetermined conveying speed can be decelerated to a slow speed when the after halting of the constant time. In comparison with a case of no decelerating means or the same predetermined conveying speed, a tension is applied to the printed rolled paper positioned between the rolled paper body and the nipping portion, so that such a curl curing mechanism is more effective. As a result, the printed sheet is formed as a flat product before ejecting.

When it takes a long time to produce the product because of using the decelerating means of the photographic control means, the acceleration means is used for accelerating such the slow conveying speed up to said predetermined conveying speed after a finishing end of the rolled paper is passed by said nipping portion.

According to the second aspect of the present invention, there is provided with a photographic printer used to print upon a rolled paper (2) which is pulled out so as to be unwound from a rolled paper body (1) and conveyed upstream with a predetermined conveying speed from said rolled paper body for a forward movement, said rolled paper having an inside surface which is wound inside said rolled paper body, said photographic printer comprising: a pick-up roller (3) unwinding and picking up said rolled paper from its beginning end; a nipping portion (P) composed of a main roller (4) and a pinch roller (5) for nipping said beginning end of said rolled paper sandwiched therebetween, so that a nipping arrangement between said main roller and said pinch roller is set with an appropriate distance; a printing head (6) for producing a predetermined photographic image data upon said inside surface as a printed rolled paper (2a); a cutter (10) cutting said printed rolled paper to produce a printed sheet immediately before ejecting from said photographic printer; and photographic control means (16) for controlling to print said predetermined photographic image data upon said rolled paper; wherein said photographic control means comprises convey-halt means (17) for halting to convey upstream said rolled paper for a backward movement until said nipping portion; and halt-continue means (18) for continuing to halt for a constant time and thereafter conveying downstream said rolled paper again, so that said printed sheet is cut in a predetermined position thereof before being ejected.

In accordance with the second aspect of the present invention, while the rolled paper is halted for the constant time by the convey-halt means, the beginning end thereof is kept upon being picked up between the main roller and the pinch roller. Although the rolled paper causing a curly paper is wound inside the rolled paper body, the curly paper is forced to be curled in its reverse direction. As a result, an amount of curl thereof by the present invention is reduced, so that the printed sheet is cured so as to be a flat paper before ejecting.

Incidentally, such a curl curing effect is obtained as to the rolled paper having a long size in a wound direction or lengthwise direction. For example, a panorama size paper is more effective than an L size paper. This is because the panorama size paper's lengthwise size is two times as long as the L size paper, so that the printed region wound again by the rolled paper body of the panorama size paper is also two times as long as the L size paper. Therefore, it is possible to manufacture a product of the printed sheet without deteriorating quality of the printed sheet. Besides, in a practical use, the product is handled to be stuck upon an album, such a way that a file is easily made.

According to the third aspect of the present invention, there is provided with a photographic printer according to the second aspect of the present invention, wherein said rolled paper has a photographic region in correspondence to the predetermined photographic image data upon said inside surface of said rolled paper which is pulled out and is unwound from said rolled paper body and said printing head is disposed on a side of said inside surface.

In accordance with third aspect of the present invention, the photographic region is produced as the predetermined photographic image data upon the inside surface of the rolled paper corresponding to the printing head.

According to the fourth aspect of the present invention, there is provided with a photographic printer according to the second aspect of the present invention, wherein said paper body arrangement distance between said rolled paper body and said nipping portion is appropriately set, so that said beginning end of said rolled paper is held in said nipping portion and said photographic region of said rolled paper is rolled back upon said rolled paper body.

In accordance with fourth aspect of the present invention, the paper body arrangement distance is appropriately set, so that the beginning end of the rolled paper is held in the nipping portion, and the photographic region of the rolled paper is rolled back upon the rolled paper body. Therefore, an amount of curl thereof by the present invention is reduced, so that the printed sheet is cured as the product so as to be a flat paper before ejecting.

According to the fifth aspect of the present invention, there is provided with a photographic printer according to the second aspect of the present invention, wherein said photographic control means comprises decelerating means (19) for decelerating to a speed slower than said predetermined conveying speed after halting of said constant time.

In accordance with the fifth aspect of the present invention, by the decelerating means of the photographic control means, the predetermined conveying speed can be decelerated to a slow speed when the after halting of the constant time. In comparison with a case of no decelerating means or the same predetermined conveying speed, the curl curing is more effective, so that the printed sheet is formed as a flat product before ejecting.

According to the sixth aspect of the present invention, there is provided with a photographic printer according to the fifth aspect of the present invention, wherein said photographic control means comprises acceleration means (20) for accelerating such a slow conveying speed up to said predetermined conveying speed after a finishing end of said rolled paper is passed by said nipping portion.

In accordance with the sixth aspect of the present invention, when it takes a long time to produce the product because of using the decelerating means of the photographic control means, the acceleration means in place of the decelerating means is used for accelerating the slow conveying speed up to said predetermined conveying speed after a finishing end of a tail of the printed rolled paper is passed by said nipping portion.

DESCRIPTION OF THE PREFERRED EMBODIMENT

Figure 1:
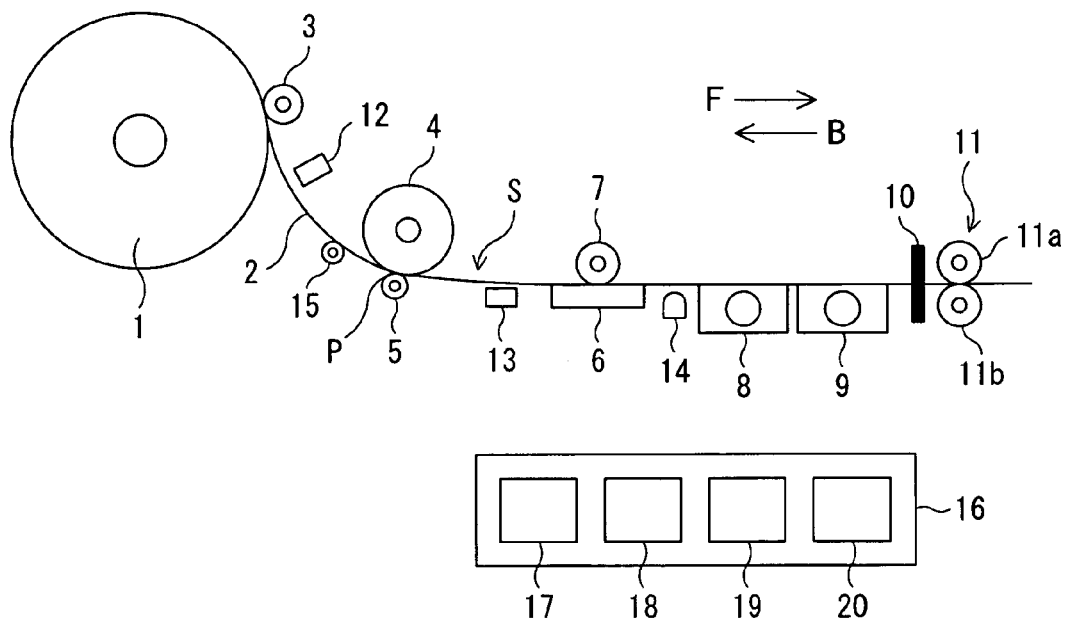
FIG. 1 is a schematic side view of a photographic printer of one embodiment according to the present invention, in a forward mode when a rolled paper is unwound.
Figure 2:
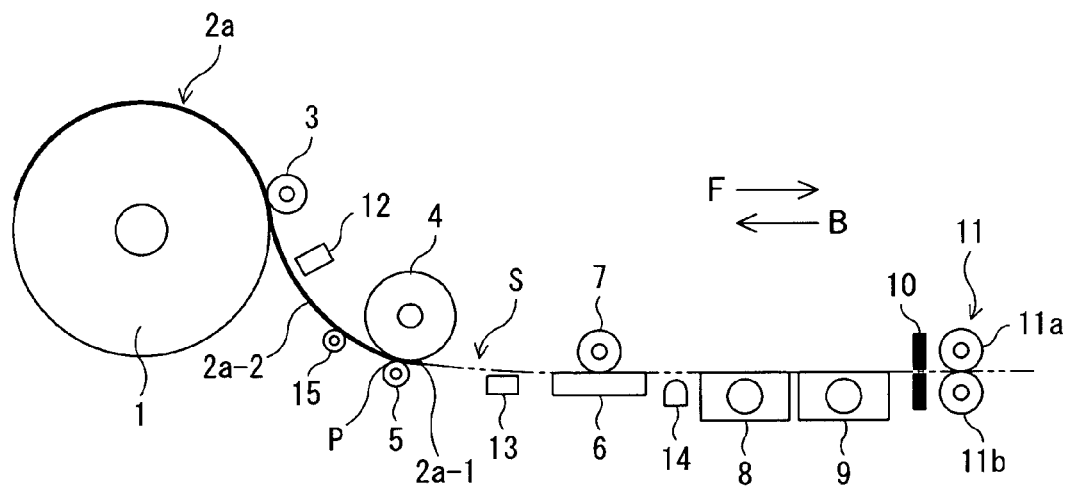
FIG. 2 is a schematic side view of the photographic printer when a finishing end of the rolled paper appears.
Figure 3:
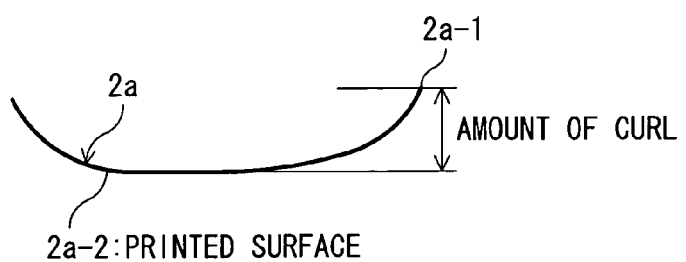
FIG. 3 is a schematic side view of a part of the rolled paper with an amount of curl.

FIG. 1 is a schematic side view of a photographic printer of one embodiment according to the present invention, in a forward mode when a rolled paper is pulled out or unwound. FIG. 2 is a schematic side view of the photographic printer when a finishing end of the rolled paper appears. FIG. 3 is a schematic side view of a part of the rolled paper with an amount of curl.

Referring now to FIGS. 1 through 3, the description will be made as to a photographic printer of one embodiment according to the present invention. The photographic printer is used to print upon a rolled paper 2 which is pulled out so as to be unwound from a rolled paper body 1 and which is conveyed with a predetermined conveying speed from the rolled paper body 1 towards downstream or forward F. The rolled paper 2 can be reciprocally conveyed upstream or backward B with the predetermined conveying speed and/or more or less wound upon the rolled paper body 1.

As illustrated in FIG. 1, the photographic printer comprises a pick-up roller 3 unwinding and picking up the rolled paper 2 from its beginning end which will later be described in reference numeral 2a-1 of FIG. 2, a nipping portion which is composed of a main roller 4 and a pinch roller 5 to convey to sandwich or pinch the rolled paper 2 and which point of contact therebetween is depicted by reference character P, a printing head 6 or thermal head for producing a predetermined photographic image data, a cutter 10 cutting the rolled paper 2 to produce a printed sheet immediately before ejecting from the photographic printer, and photographic control means 16 for controlling to print the predetermined photographic image data upon the rolled paper 2. The rollers 4 and 5 of the nipping portion revolve in opposite directions to convey the rolled paper 2 which is entered in a gap at P therebetween so as to be pinched. Hereinafter, the nipping portion is collectively called by reference character P.

More specifically, the photographic printer comprises a platen roller 7 facing the printing head 6, vacuum fluorescent tubes 8 and 9 for fixing a magenta color and a yellow color, and a pair of ejection rollers 11a and 11b which is disposed in an up position and in a down position and which are hereinafter collectively called by reference number 11 for ejecting the paper sheet as a product after being cut by the cutter 10.

Furthermore, an end detection sensor 12 for detecting a finishing end (which will be later described with reference to FIG. 2) of the rolled paper 2 and a top detection sensor 13 for detecting a beginning end (which will be likewise later described with reference to FIG. 2) of the rolled paper 2 are alternatively disposed along an up surface (outside surface) and a down surface (inside surface) of the rolled paper 2 upon up-left and down-right sides of the pinching portion's point of contact P. Each of the detection sensors 12 and 13 may be a typically photo-sensor of the reflection type which an LED (Light Emitting Diode) and a light-receiving device are manufactured integrally to each other. A CCD sensor 14 is disposed between the printing head 6 and the vacuum fluorescent tube for magenta 8, for detecting width of the rolled paper 2 unwound from the rolled paper body 1. Incidentally, a subsidiary roller for supporting the rolled paper 2 is represented by reference numeral 15.

Of a CPU, an ROM, an RAM and so on (not shown), the photographic control means 16 are composed, for controlling to drive such a roller mechanism as to an operation of producing power-on/off timing signals towards the vacuum fluorescent tubes 8 and 9.

As shown in FIG. 2, it should be noted that the photographic control means 16 comprises conveying halt means 17 for halting to convey upstream the printed rolled paper 2a for a backward movement B until the nipping portion's point of contact P, and hatl-continue means 18 for continuing to halt for a constant time and thereafter conveying the printed rolled paper 2a depicted in a boldface or thick line again towards the downstream or forward F, so that the printed sheet or paper sheet is cut in a predetermined position of the printed rolled paper 2a before being ejected from the photographic printer.

Furthermore, the printed rolled paper 2a has a photographic region in correspondence to the predetermined photographic image data upon the inside surface of the rolled paper 2 unwound from the rolled paper body 1 and the printing head 6 is disposed upon a side of the inside surface 2a-2.

By the way, a paper body arrangement distance between the rolled paper body 1 and the nipping portion P is appropriately set. And then, a beginning end 2a-1 of a head of the printed rolled paper 2a is held in the nipping portion's point of contact P. At the same time, the photographic region of the printed rolled paper 2a is formed upon an inside surface 2a-2 thereof supported by the subsidiary roller 15.

In addition thereto, the photographic control means 16 further comprises decelerating means 19 for decelerating to a speed slower than the predetermined conveying speed after halting of the constant time and acceleration means 20 for accelerating such a slow speed up to the predetermined conveying speed after a finishing end of a tail of the printed rolled paper 2a is passed by the nipping portion P.

Figure 4:
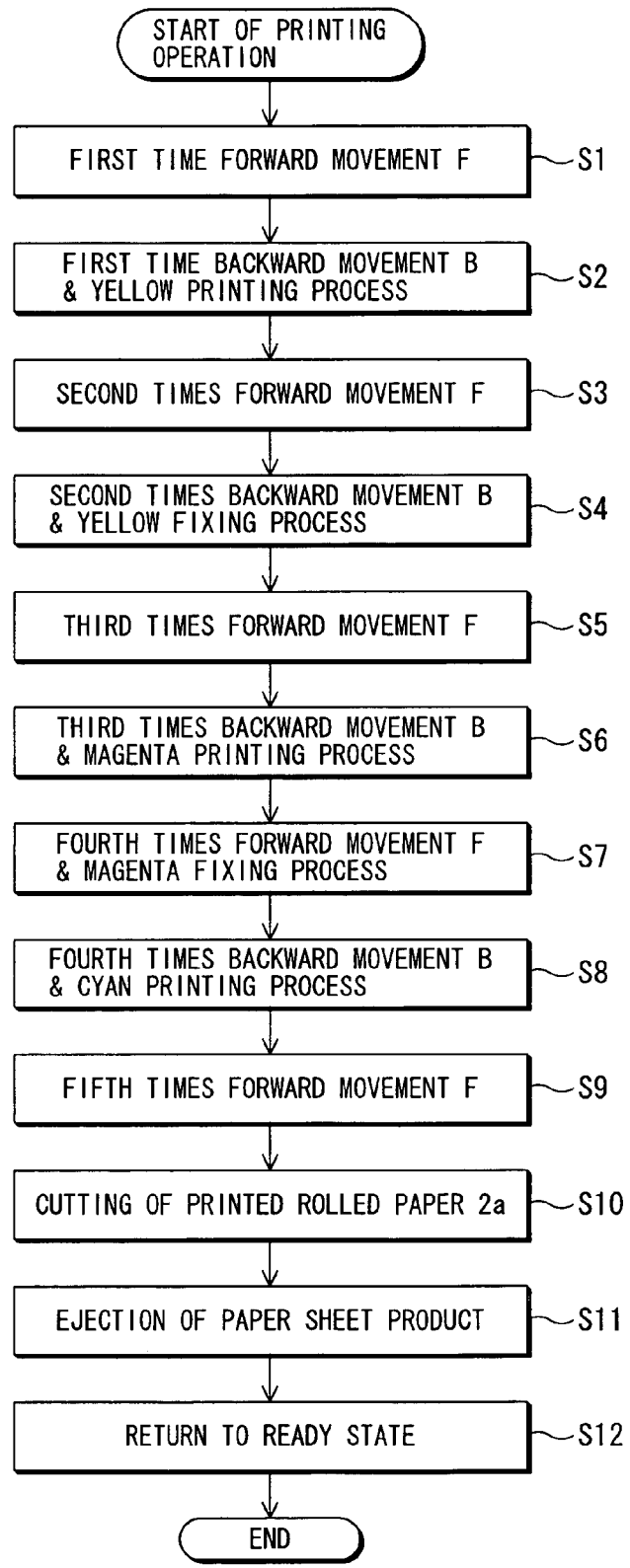
FIG. 4 is a flow chart of a basic photographic printing operation of the photographic printer depicted in FIG. 1.

FIG. 4 is a flow chart of a basic photographic printing operation of the photographic printer depicted in FIG. 1.

In operation, at the first time, the rolled paper body 1 is completely kept upon all of the rolled paper 2 being wound thereupon, so that a ready state is prepared before the photographic printing operation. When a request for print is received in the photographic control means 16, the rolled paper 2 is conveyed downward as a first time forward F (step S1 of FIG. 4) and is halted in a position depicted in FIG. 1. A finishing end of the rolled paper 2 is set to be in position on an ejection paper sheet side or a down stream side from the printing head 6.

In a step S2, the first time backward movement B is carried out, so that the rolled paper 2 is wound back upstream upon the rolled paper body 1 and the yellow printing processes for heating at a first predetermined thermo-sensitive temperature bringing about yellow coloring by means of the printing head 6 serves to form a yellow image upon a yellow thermo-sensitive color layer of the rolled paper 2. The first predetermined thermo-sensitive temperature is other than thermo-sensitive temperature for a magenta color or a cyan color.

In a step S3, after such a yellow image forming is completed, the rolled paper 2 is conveyed backward as a second backward movement, in such a way that the rolled paper 2 is repeatedly conveyed to halt until being disposed to be in a fixing position. The fixing position is the place where the finishing end of the rolled paper 2 is set to be on the ejection paper sheet side from an exposure region of the yellow fluorescent tube 9. A shutter which is not illustrated in the drawing is covered with an upper portion of a reflector which is contained in the yellow fluorescent tube 9.

In a step S4, the photographic control means 16 controls to convey back in a second times backward movement F after lighting or radiating of the yellow fluorescent tube 9. As for a yellow fixing process, a yellow image is fixed upon such a yellow image forming region of the rolled paper 2 by being exposed by means of the yellow fluorescent tube 9. The shutter is halted when the magenta fluorescent tube 8 reaches in a mode covered with a whole upper portion of the reflector. The photographic control means 16 controls to expose such an entire yellow image forming region and to halt conveying the rolled paper 2 upstream with no radiation of the yellow fluorescent tube 9.

Next, in a step S5, a third times forward movement is carried out up to such an image forming position.

Referring now to a step S6, after a cyan photosensitive layer of the rolled paper 2 is colored by the printing head 6, the printed rolled paper 2a is wound back and is conveyed again upstream upon the rolled paper body 1 at a three times backward movement.

After that, a fourth times forward/backward movements & fixing processes and a fifth times forward movement F are carried out in order as to steps S7 through S9.

In a cutting step S10, a cutter 3 cuts respectively the beginning end and a finishing end of the printed rolled paper 2a to produce a printed sheet product to immediately before an ejecting step S11 for ejecting the printed sheet product 2a by a pair of ejection rollers 11 from a body of the photographic printer.

In a step S11, the ejection paper sheet step is carried out, so that a cut portion is ejected as a product. After that, in a step S12, a ready state is returned, in such a way that a basic operation is halted and is fully completed.

EXAMPLE 1

Figure 5:
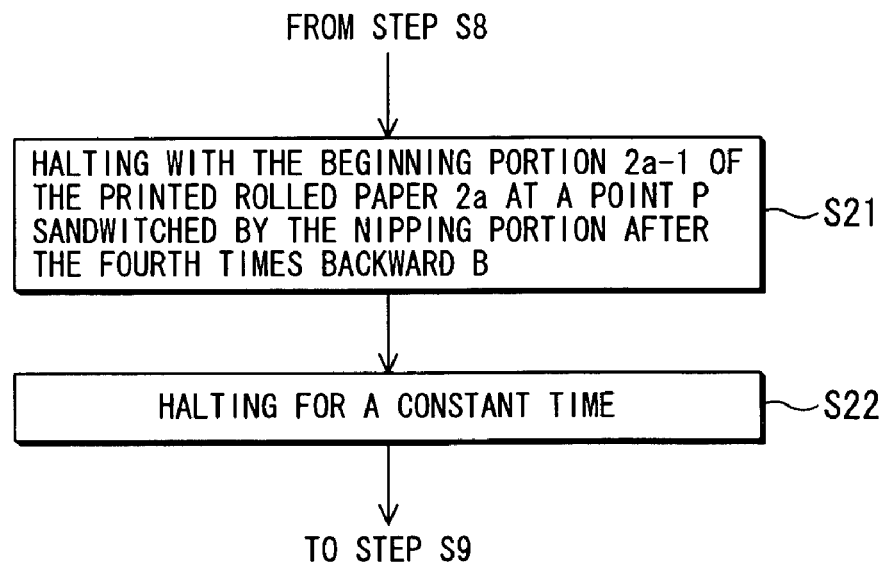
FIG. 5 is another flow chart of FIG. 4.
Figure 6:
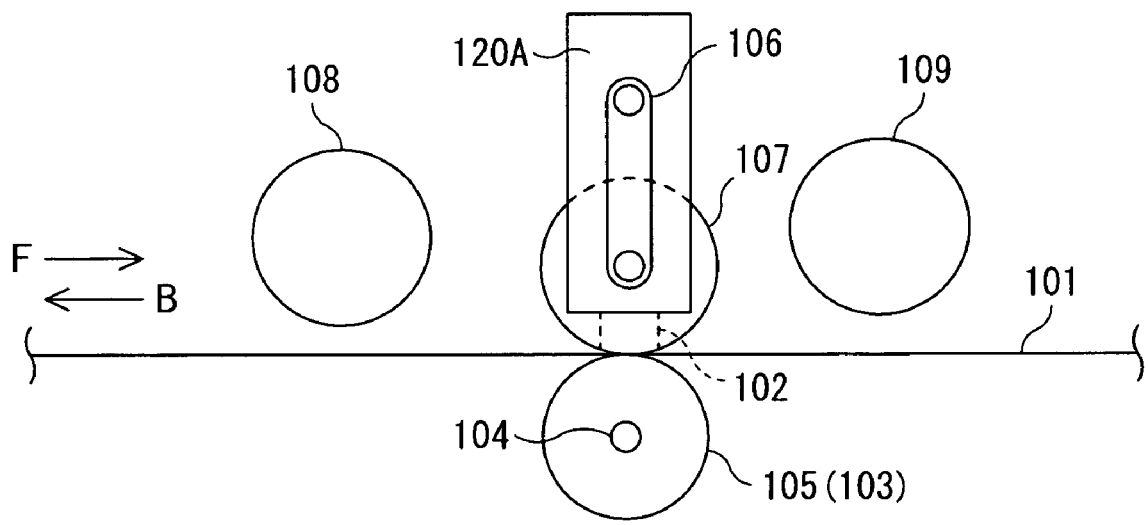
FIG. 6 is a schematic side view of the related art apparatus.

FIG. 5 is another flow chart of FIG. 4.

In operation for one embodiment according to the present invention, additional steps for operating the curl curing mechanism of rolled paper sheet are as follows. A step S21 is carried out from the step 8. That is to say, a halting is carried out with the beginning portion 2a-1 of the rolled paper 2 at a point P sandwiched by the nipping portion after the fourth times backward movement B. In a step S22, the halting is continued for a constant time.

After a cyan photosensitive layer of the rolled paper 2 is colored by the printing head 6, the printed rolled paper 2a is wound back and is conveyed again upstream upon a rolled paper body 1 at a three times backward movement, referring now to a step S6 depicted in FIG. 4. The beginning end 2a-1 of the printed rolled paper 2a is halted and is kept upon being pinched in a position up to the point of contact P of the nipping portion between the mail roller 4 and the pinch roller 5 for a constant time, such as three (3) seconds.

As stated above, after each color printing of a yellow, a magenta, and a cyan, the printed rolled paper 2a is wound upon the rolled paper body 1 and is halted for the constant time of three (3) seconds by the convey-halt means 17. The beginning end 2a-1 of the printed rolled paper 2a is kept upon being pinched or sandwiched or picked up between the main roller 4 and the pinch roller 5. Although the printed rolled paper 2a causing a curly paper is wound inside the rolled paper body 1, the curly paper is forced to be curled in its reverse direction. As a result, an amount of curl thereof by the present invention is reduced, so that the printed sheet is cured so as to be a flat paper before ejecting.

Incidentally, such a curl curing effect is better as to the printed rolled paper 2a having a long size in a wound direction or lengthwise direction. As a lengthwise size paper is longer, it is more effective.

Therefore, the paper body arrangement distance of the rolled paper body 1 and the nipping portion's point of contact P is appropriately set, so that the beginning end 2a-1 of the printed rolled paper 2a is held in the nipping portion, and the photographic region of the printed rolled paper 2a is rolled back upon the rolled paper body 1.

To be more precise, inasmuch as such a curl curing effect is obtained as to the rolled paper 2 having a long size in a wound direction or lengthwise direction, the photographic printer makes a use of four kinds of an L size, a high-vision size, a postcard size, and a panorama size papers. Each length of the lengthwise direction of the L size paper and the panorama size paper is 127 mm and 254 mm. In case of the L size paper, an approximately half of the rolled paper 2 of the panorama size paper is wound back again upon the rolled paper body 1, in such a way that both of the rolled paper body 1 and the point of contact P of the nipping portion between the main roller 4 and the pinch roller 5 are spaced members which are set to be sixty (60) millimeters (mm) through seventy (70) millimeters (mm) away.

Under such conditions, the operation of printing of the example 1 according to one embodiment of the present invention is carried out as to the rolled paper 2 causing a curly paper. Its amount of curl depicted in FIG. 3 is approximately four (4) millimeters (mm). Inasmuch as an example of the related art apparatus is used, so that a paper sheet is produced so as to have an amount of curl with an approximately eight (8) millimeters (mm), the printed sheet of the example 1 according to one embodiment of the present invention is remarkably reduced as to such an amount of curl.

Therefore, it is possible to manufacture a product of the printed sheet without deteriorating quality of the printed sheet. Besides, in a practical use, the product is handled to be stuck upon an album, such a way that a file is easily made.

EXAMPLE 2

It should be noted that in the step S9 of fifth times forward movement F, by the decelerating means 19 of the photographic control means 16, the predetermined conveying speed is decelerated to a slow speed after halting of the constant time.

Such a decelerated slow speed at the fifth times forward movement F of the step S9 is set to be any speed within a range of a quarter through a half of the predetermined conveying speed.

Furthermore, the rolled paper body 1 is controlled to be driven with a delayed rotation speed which is set to be a little bit less than that of the main roller 4. A tension is thus applied to the printed rolled paper 2a positioned between the rolled paper body 1 and the main roller 4, in such a way that an effective curl curing mechanism is obtained.

Herein comparison with a case of no decelerating means or the same predetermined conveying speed of the fifth times forward movement F of the step S9, the example 2 is decelerated to the half predetermined conveying speed, so that the amount of curl of an L size rolled paper is approximately 3.5 millimeters (mm). As a result, it is found out that the curl curing mechanism serves to bring about reduction of curl amount of zero point five (0.5) millimeters.

EXAMPLE 3

When it takes a long time to produce the product because of using the decelerating means 19 of the photographic control means 16, the acceleration means 20 are used for accelerating the slow conveying speed up to said predetermined conveying speed to get back after a finishing end of a tail of the printed rolled paper 2 is passed by said nipping portion's point of contact P.

It is thus possible to prevent taking a long time as to the operation of the photographic printing.

Incidentally, the photographic control means 16 can control to ask a switchback signal in such a way that an accelerating or exchanging timing signal is asked upon passing through the point of contact P of the nipping portion composed of the main roller 4 and the pinch roller 5 by computing in the following procedures. First way, the detection signal of the beginning end of the printed rolled paper 2a is produced from the top detection sensor 13. Second, the main roller 4 is driven by a driving motor such as a stepping motor for counting a stepping number serving as its motor rotation number. The length of the printed rolled paper 2a conveyed up to the beginning end 2a-1 is obtained by calculating such a counting number signal. Third, not only the above-mentioned accelerating timing signal, but also a conveyed distance or length conveyed in the lengthwise direction of the printed rolled paper 2a can be asked by mean (especially, the end detection sensor 12) of detecting the time passing through the point of contact P as to the finishing end of the tail of the printed rolled paper 2a.

While a preferred embodiment with three examples has been shown and described, it will now readily be possible for those skilled in the art to put the present invention into practice in various other manners. For example, the nipping portion may have a movable adjustment mechanism instead of one of the pair of rollers 4 and 5, in such a way that each tension in any position of the printed rolled paper 2a is suitably adjusted so as to help the improvement in the quality of the above-mentioned printed rolled paper product.

What is claimed is:

1. A photographic printer used to print upon a rolled paper which is pulled out so as to be unwound from a rolled paper body and conveyed upstream with a predetermined conveying speed from said rolled paper body for a forward movement, said rolled paper having an inside surface which is wound inside said rolled paper body, said photographic printer comprising:
    a pick-up roller unwinding and picking up said rolled paper from its beginning end;
    a nipping portion composed of a main roller and a pinch roller for nipping said beginning end of said rolled paper sandwiched therebetween, so that a nipping arrangement between said main roller and said pinch roller is set with an appropriate distance;
    a printing head for producing a predetermined photographic image data upon said inside surface as a printed rolled paper;
    a cutter cutting said printed rolled paper to produce a printed sheet immediately before ejecting from said photographic printer; and
    photographic control means for controlling to print said predetermined photographic image data upon said rolled paper;
    wherein said photographic control means comprises convey-halt means for halting to convey upstream said rolled paper for a backward movement until said nipping portion; and
    halt-convey means for continuing to halt for a constant time and thereafter conveying downstream said rolled paper again, so that said printed sheet is cut in a predetermined position thereof before being ejected;
    wherein said rolled paper has a photographic region in correspondence to the predetermined photographic image data upon said inside surface of said rolled paper which is pulled out and is unwound from said rolled paper body and said printing head is disposed on a side of said inside surface;
    wherein a paper body arrangement distance between said rolled paper body and said nipping portion is appropriately set, so that said beginning end of said rolled paper is held in said nipping portion and said photographic region of said rolled paper is rolled back upon said rolled paper body;
    wherein said photographic control means comprises decelerating means for decelerating to a speed slower than said predetermined conveying speed after halting of said constant time; and
    wherein said photographic control means comprises acceleration means for accelerating such a slow conveying speed up to said predetermined conveying speed after a finishing end of said rolled paper is passed by said nipping portion.

2. A photographic printer used to print upon a rolled paper which is pulled out so as to be unwound from a rolled paper body and conveyed upstream with a predetermined conveying speed from said rolled paper body for a forward movement, said rolled paper having an inside surface which is wound inside said rolled paper body, said photographic printer comprising:
    a pick-up roller unwinding and picking up said rolled paper from its beginning end;
    a nipping portion composed of a main roller and a pinch roller for nipping said beginning end of said rolled paper sandwiched therebetween, so that a nipping arrangement between said main roller and said pinch roller is set with an appropriate distance;

a printing head for producing a predetermined photographic image data upon said inside surface as a printed rolled paper;

a cutter cutting said printed rolled paper to produce a printed sheet immediately before ejecting from said photographic printer; and photographic control means for controlling to print said predetermined photographic image data upon said rolled paper;

wherein said photographic control means comprises convey-halt means for halting to convey upstream said rolled paper for a backward movement until said nipping portion; and halt-continue means for continuing to halt for a constant time and thereafter conveying downstream said rolled paper again, so that said printed sheet is cut in a predetermined position thereof before being ejected.

3. A photographic printer according to claim 2, wherein said rolled paper has a photographic region in correspondence to the predetermined photographic image data upon said inside surface of said rolled paper which is pulled out and is unwound from said rolled paper body and said printing head is disposed on a side of said inside surface.

4. A photographic printer according to claim 2, wherein a paper body arrangement distance between said rolled paper body and said nipping portion is appropriately set, so that said beginning end of said rolled paper is held in said nipping portion and said photographic region of said rolled paper is rolled back upon said rolled paper body.

5. A photographic printer according to claim 2, wherein said photographic control means comprises decelerating means for decelerating to a speed slower than said predetermined conveying speed after halting of said constant time.

6. A photographic printer according to claim 5, wherein said photographic control means comprises acceleration means for accelerating such a slow conveying speed up to said predetermined conveying speed after a finishing end of said rolled paper is passed by said nipping portion.

* * * * *